United States Patent [19]
McRobert

[11] 3,886,951
[45] June 3, 1975

[54] TRASH SEPARATOR

[76] Inventor: Leon R. McRobert, 611 Spring St., Ocoee, Fla. 32761

[22] Filed: Aug. 6, 1973

[21] Appl. No.: 386,140

Related U.S. Application Data

[62] Division of Ser. No. 248,146, April 22, 1972, Pat. No. 3,828,534.

[52] U.S. Cl. ............................. 130/30 R; 209/114
[51] Int. Cl. .................................................... A01d
[58] Field of Search ........ 56/328 R; 171/12, 18, 28; 130/30 R; 209/114

[56] References Cited
UNITED STATES PATENTS

| | | | |
|---|---|---|---|
| 1,032,175 | 7/1912 | Baas | 171/12 |
| 1,525,181 | 2/1925 | Hamachek | 209/114 |
| 1,895,268 | 1/1933 | Silver | 209/114 |
| 2,828,825 | 4/1958 | Johnson | 171/118 |
| 2,896,728 | 7/1959 | Pridy | 171/130 |
| 3,225,771 | 12/1965 | McRobert | 130/30 R |
| 3,799,338 | 3/1974 | Duda, Jr. | 209/114 |

FOREIGN PATENTS OR APPLICATIONS 528,446  6/1955  Italy .................................. 171/130

*Primary Examiner*—Russell R. Kinsey
*Attorney, Agent, or Firm*—C. E. Tripp; A. J. Moore

[57] ABSTRACT

A trash separator for a mobile article pickup machine which picks up rollable articles such as citrus fruit from a surface which varies in contour both longitudinally and laterally of the path of movement of the machine. A steeply inclined bar elevator lifts citrus fruit from the ground or supporting surface, and a weighted draper bears against the fruit and causes the fruit to roll and become partially cleaned as it is moved up the elevator. The weights prevent movement of the fruit down the elevator. The trash separator receives the fruit from the elevator and serves to separate the large trash, non-rollable fruit, and fine debris from the rollable marketable fruit.

2 Claims, 6 Drawing Figures

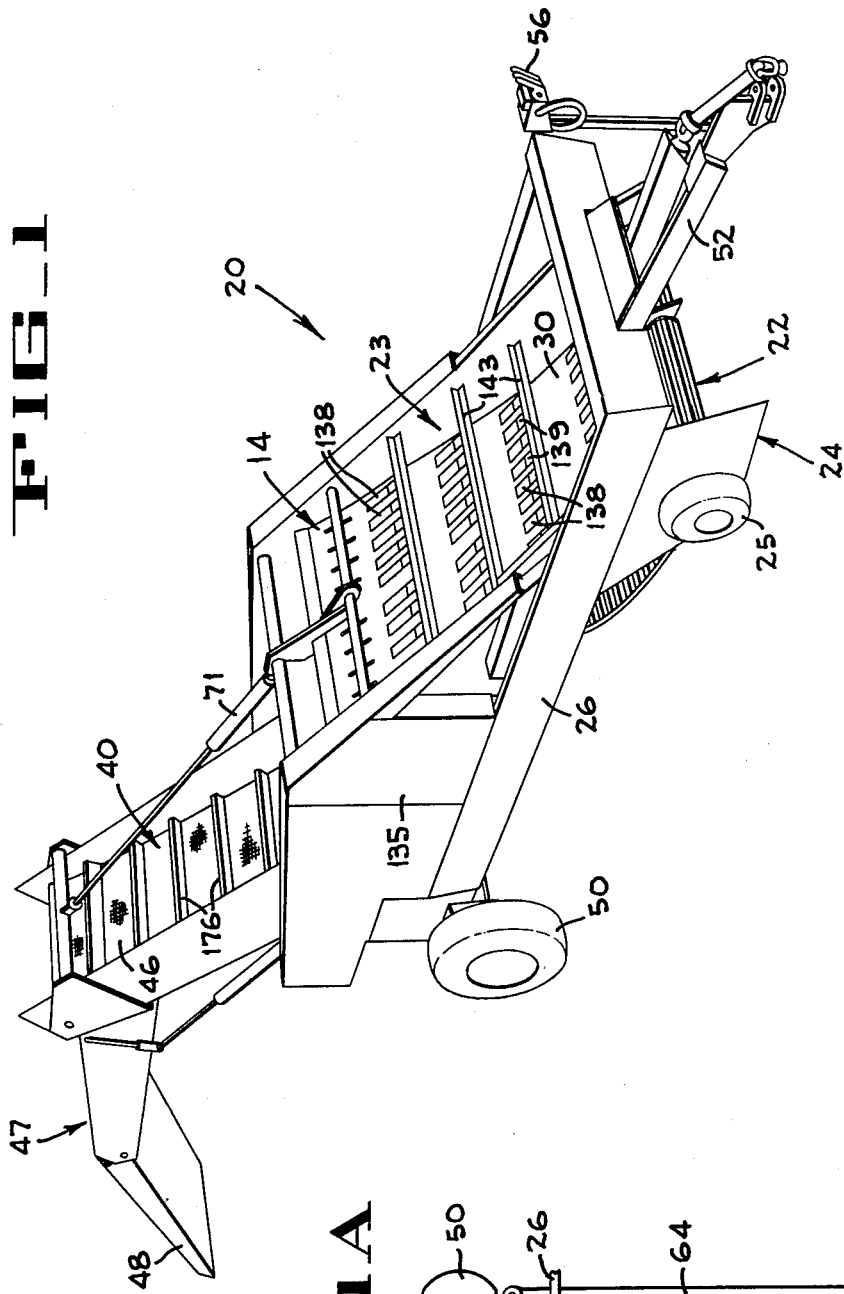
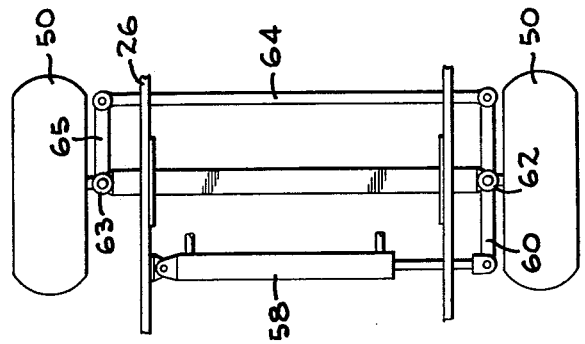

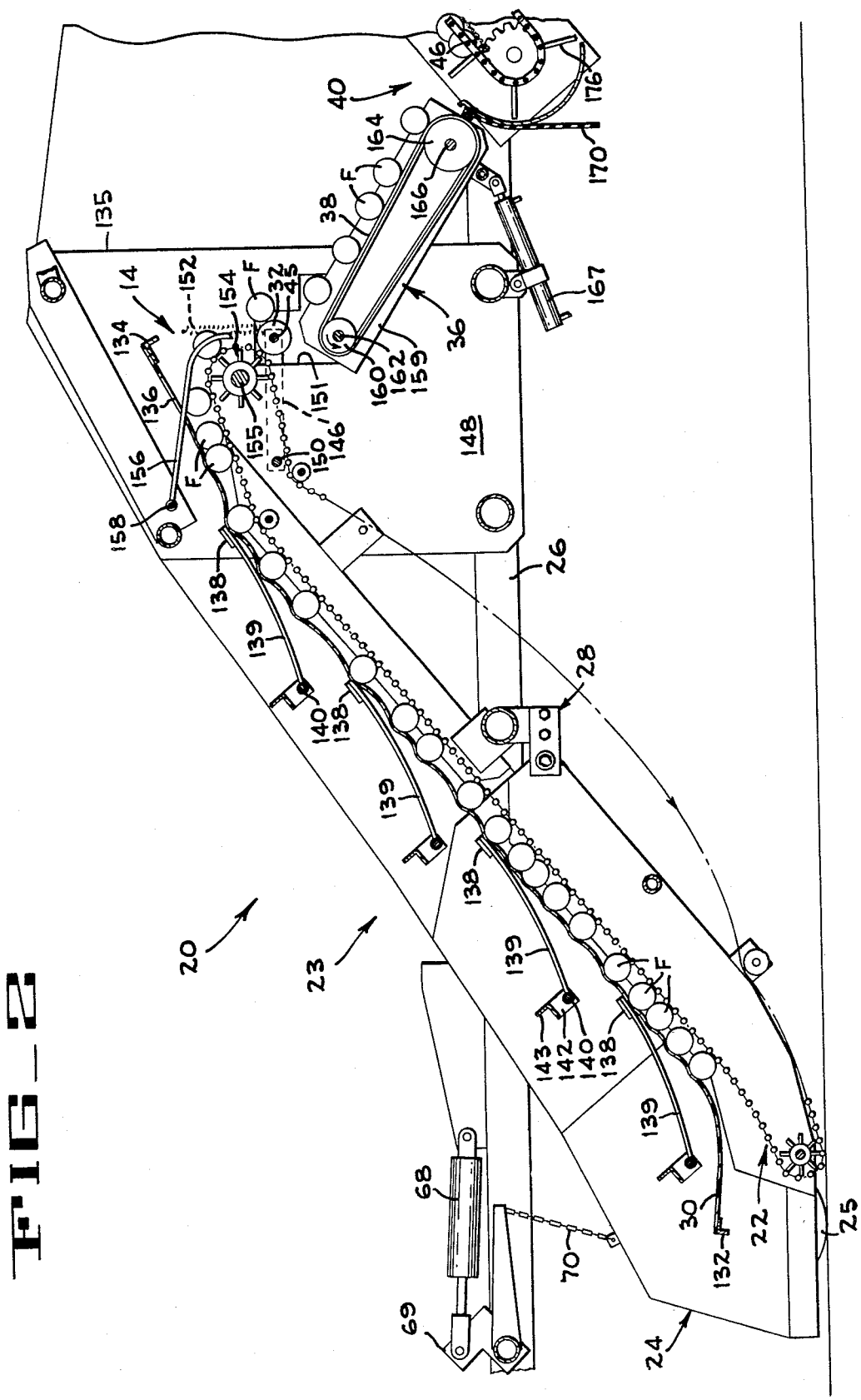

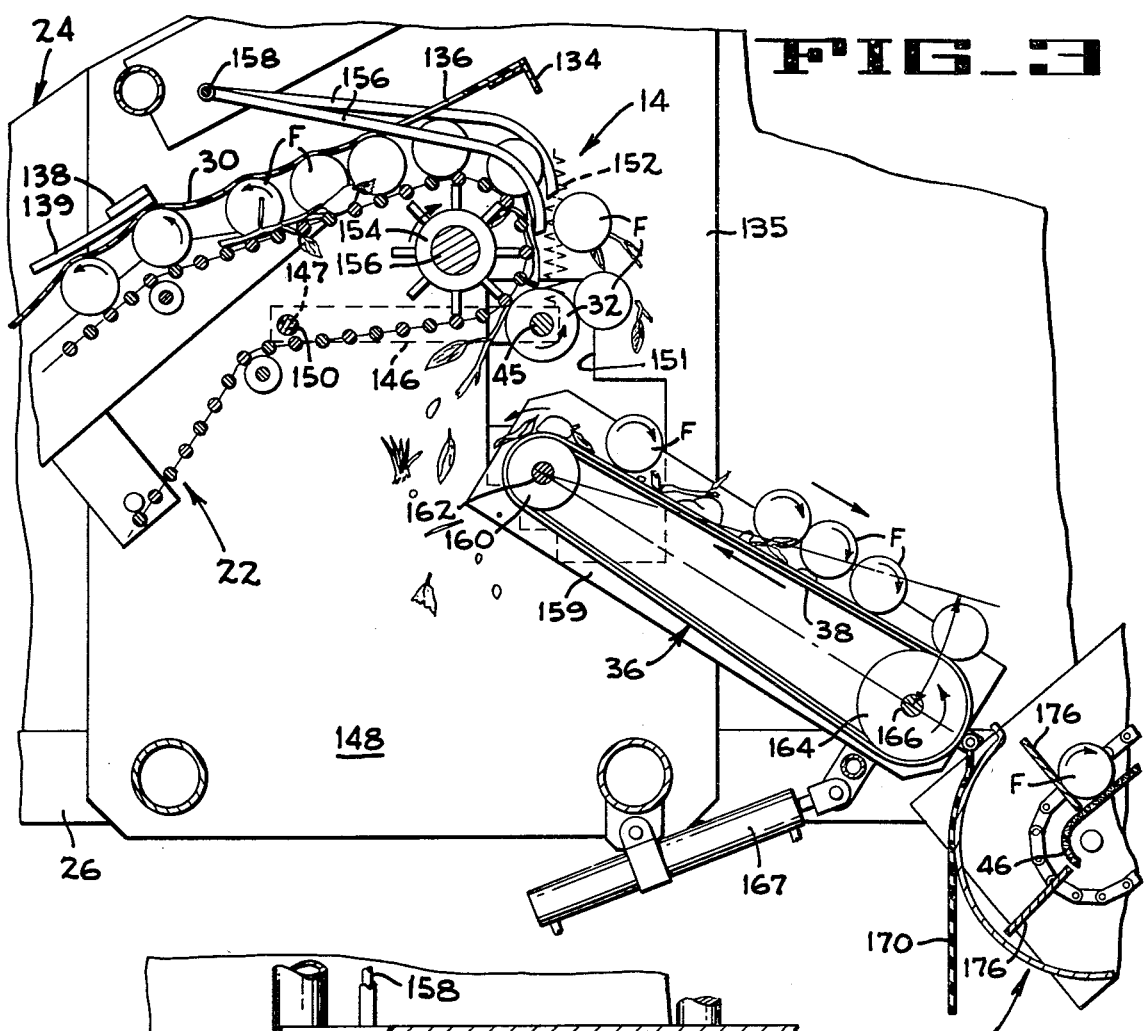
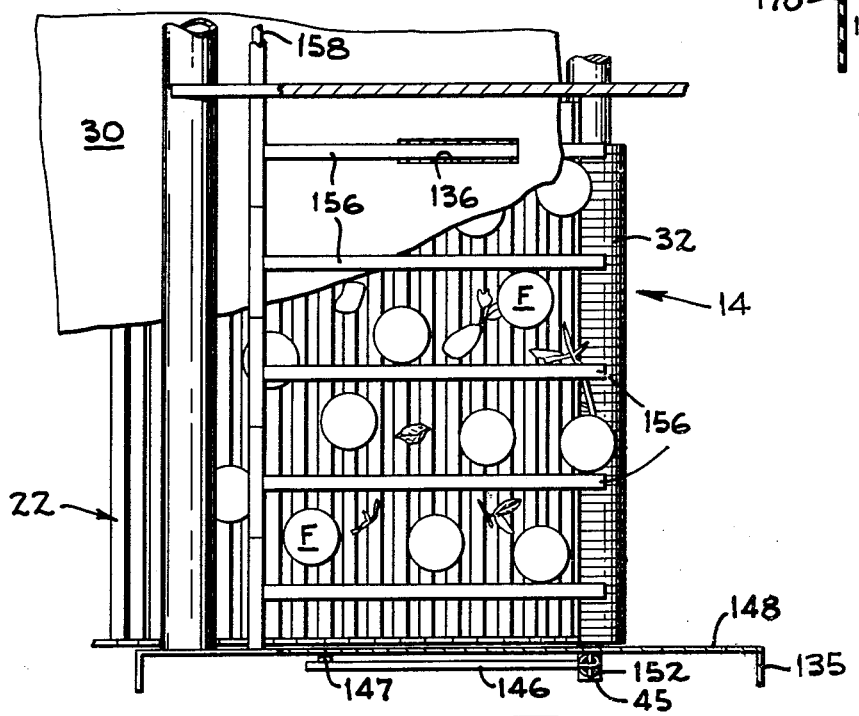

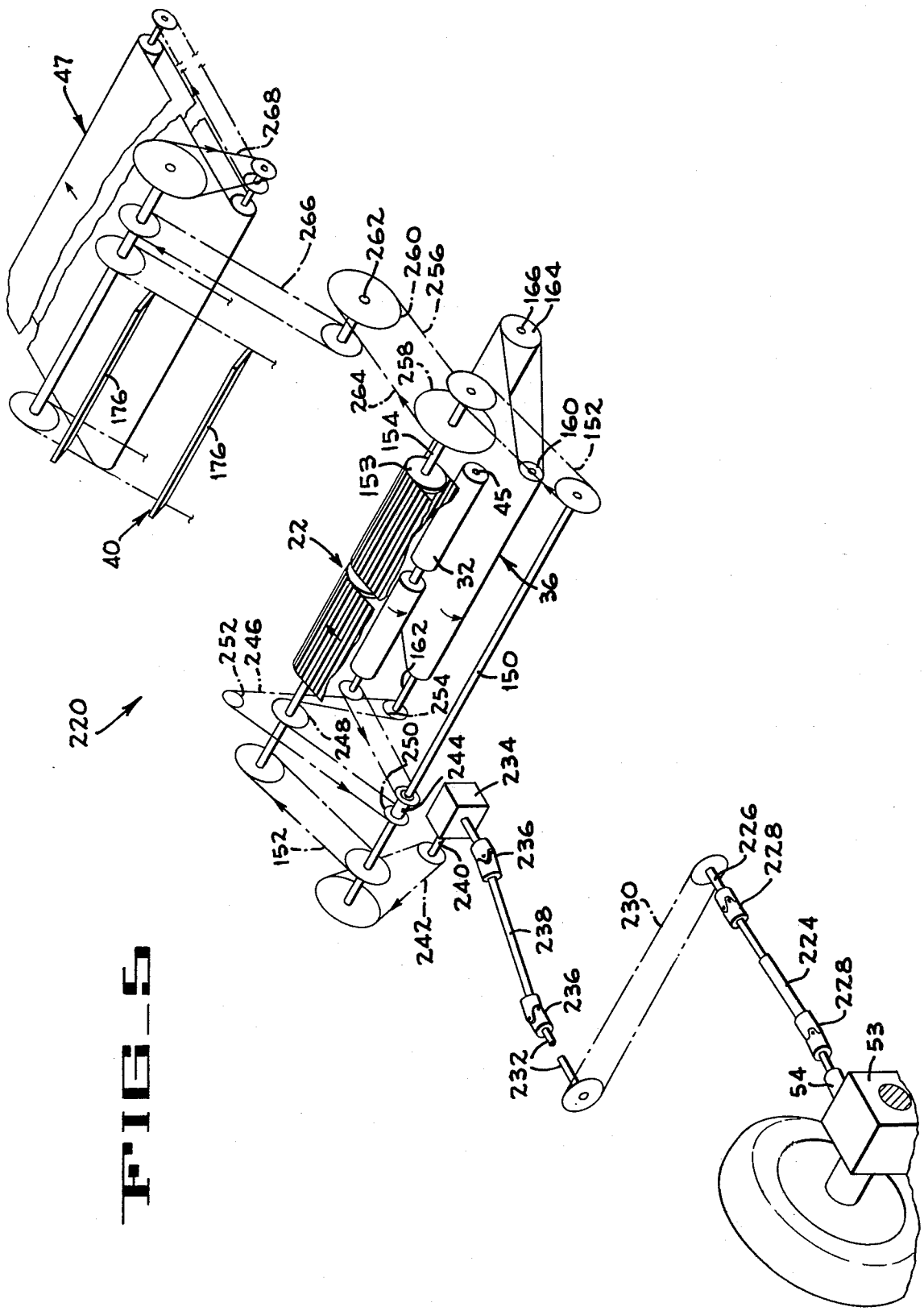

TRASH SEPARATOR

CROSS REFERENCE TO RELATED APPLICATIONS

The present application is a division of McRobert application Ser. No. 248,146 filed on Apr. 27, 1972 and now U.S. Pat. No. 3828534.

BACKGROUND OF THE INVENTION

1. Field of the Invention

This invention pertains to the article cleaning art; and more particularly relates to a trash separator in a machine for picking up marketable fruit or the like, along with debris and unmarketable fruit, from ground which varies in contour, and then cleaning the debris and defective fruit from the marketable fruit.

2. Description of the Prior Art

Article pickup machines with elevators which follow varied ground contours are well known in the art. The prior art structures for mounting the elevators to permit the forward lower edge of the elevator to raise and lower and also to follow the transverse contour of the ground included, in many cases, either a non-rigid flexible elevator frame or a large and complicated pivot ring connection between the elevator frame and the vehicle chassis. Also, certain of the prior art devices which were adapted to handle rollable articles were unduly long and cumbersome because the elevators were not steeply inclined but were placed at low inclinations to prevent the articles from rolling down the elevator.

An additional problem not adequately solved by the prior art device was the provision of a trash cleaning device which would discharge large debris, small debris, and defective non-rotatable fruit from the marketable fruit to be collected.

SUMMARY OF THE INVENTION

The trash separator of the present invention is associated with a pickup machine which comprises a mobile vehicle movable along a predetermined path for picking up rollable articles. Many types of articles may be picked up by the machine, however, the preferred embodiment of the machine has been designed to pick up citrus fruit from ground which may vary in contour both longitudinally and laterally of the path of movement of the machine. The fruit is preferably placed in windrows prior to being picked up by the subject machine, and will hereafter be referred to as fruit although it is understood that many other types of articles may be picked up by the machine.

A steeply inclined bar elevator is mounted on a rigid elevator frame having a pair of ground engaging wheels on the forward end for following the undulations of the ground.

In order to aid in moving the fruit up the steeply inclined elevator, a flexible draper is anchored in position over the upper run of the elevator and has weights associated therewith to permit upward movement of the fruit but prevent rolling of the fruit down the elevator. The fruit is rolled against the draper by the elevator causing the fruit to move upwardly at about half the speed of the elevator, and also causing debris clinging to the fruit to be frictionally disengaged therefrom. A trash separator cooperates with the elevator to further clean or separate foreign matter from the marketable fruit. The trash separator includes a clamping roller which clamps large twigs, leaves, grass and like debris and discharges this debris from the path of movement of the fruit. The fruit, including additional debris not captured by the clamping roller, falls upon an inclined cleaning conveyor having its article supporting run moving upwardly. The inclination of the cleaning conveyor is sufficient to cause the debris and damaged or rotted fruit having flat spots or the like therein to remain on the conveyor and move over the upper end thereof. The marketable fruit is sufficiently firm and rollable to roll down the inclination of the cleaning conveyor for further cleaning and subsequent conveyance to a collecting means.

It is, therefore, one object of the present invention to provide an improved trash separator for a machine which picks up rollable articles from uneven surfaces.

Another object is to provide an improved trash cleaning or separating mechanism.

BRIEF DESCRIPTION OF THE DRAWINGS

FIG. 1 is a perspective of a pickup machine which includes the trash separator of the present invention illustrated in operative position but with the towing vehicle and the fruit receiving bulk truck not being illustrated.

FIG. 1A is a schematic view in plan illustrating the apparatus for steering the rear wheels of the vehicle.

FIG. 2 is a diagrammatic vertical central section of a front portion of the machine of FIG. 1 with parts being shown in their operative pickup position.

FIG. 3 is an enlarged operational view in vertical section illustrating the operation of the trash separator.

FIG. 4 is a plan view of the separator of FIG. 3 illustrating the trash hold-down fingers.

FIG. 5 is a diagrammatic perspective illustrating the drive mechanism.

DESCRIPTION OF THE PREFERRED EMBODIMENT

The trash separator 14 (FIG. 2) of the present invention is illustrated as a component of an article pickup machine 20 (FIGS. 1 and 2) which is specifically designed to handle citrus fruit F which has been placed in windrows on ground that is not perfectly flat but has the usual undulations therein. It will be understood, however, that other types of fruit, nuts, and non-agricultural articles may be picked up by the machine 20 and loaded into a bulk truck or the like which follows the machine.

In general, the pickup machine 20 comprises a spaced bar pickup elevator 22 of a pickup elevating mechanism 23. The elevator 22 has its forward end mounted on a rigid pickup elevator frame 24 that has ground engaging wheels 25 on its forward end to cause the frame to follow the varying ground contours. The rear end of the elevator frame 24 is mounted to the chassis 26 of the machine 20 by a three point pivotal suspension mechanism 28 which allows the rigid frame to freely follow the ground undulations. The fruit picked off the ground is held on the elevator 22, which is steeply inclined, by a weighted draper 30 which causes the fruit to roll and move up the elevator at about one-half the speed of the elevator. The rolling of the fruit dislodges dirt therefrom and partially cleans the same. Debris, such as twigs, grass, and dirt clods is also carried up the elevator with the fruit F, and the large debris is separated from the fruit by a clamping or devining roller 32 (FIG. 2) of a trash separator 14. The fruit F, including defective fruit such as partially rotted or deformed fruit, and other debris is discharged upon a rough surfaced cleaning belt conveyor 36 which is inclined and has its upper run 38 driven upwardly at a rate which will allow the marketable fruit which is readily rollable to roll off the lower end into a cross-bar elevator 40, and causes the debris including defective fruit which resists rolling to move upwardly for discharge upon the ground over the upper end of the cleaning belt conveyor 36. The cross-bar elevator 40 then moves the collected fruit up over a screen 46 for further cleaning. The cleaned fruit F is then advanced by a conveyor 47 into a chute 48 for gravitational discharge into a truck (not shown).

More particularly, the pickup machine 20 (FIGS. 1 and 2) includes the chassis 26 which is supported by steerable rear wheels 50 (FIG. 1A) and has its front end or tongue 52 connected to the draw bar of a tractor 53 (FIG. 5). The several conveyors and elevators are driven from the power take-off 54 of the tractor, and the several hydraulically controlled components of the machine 20 are powered from the conventional tractor hydraulic system (not shown) and are independently controlled by a conventional control unit 56 which is shown supported on the machine 20 in FIG. 1 but is clamped on the tractor within easy reach of the operator during normal operation.

As diagrammatically illustrated in FIG. 1A the rear wheels 50 are steered by a hydraulic cylinder 58 connected between the chassis 26 and a lever 60. The lever is connected to one wheel supporting spindle 62, which spindle is pivotally connected to the other wheel supporting spindle 63 by a tie bar 64 and cooperating levers 65. Thus, the operator may actuate one of a plurality of valves in the control unit 56 (FIG. 1) to pivot the two rear wheels 50 in unison about vertical pivot axes thereby materially shortening the turning radius of the pickup machine 20. During sharp turns and when the vehicle is transported from place to place, the operator lifts the front end of the elevator frame 24 off the ground by actuating another valve in the hydraulic control unit 56 which operates the pair (only one being shown in FIG. 2) of hydraulic cylinders 68, each cylinder being connected between the chassis 26 and one arm of a bell crank 69 journaled on the chassis. The other arm of the bell crank is connected to the forward end of the elevator frame 24 by a link such as a chain 70.

An important feature of the pickup elevating mechanism 23 is the provision of the draper 30 (FIG. 2) which overlies the elevator 22 and serves to apply a force upon the fruit F to prevent the fruit from gravitating down the steeply inclined elevator. The draper 30 performs the additional function of rolling the fruit thus causing the fruit to move up the elevator at about one-half the speed of the elevator, and also dislodge dirt or mud which may cling to the fruit thereby partially cleaning the fruit.

The draper 30 is formed from a sheet of flexible material such as canvas, plastic belting, or the like which has its lower end anchored to an angle member 132 (FIG. 2) that is secured to and extends transversely across the pickup elevator frame 24, and has its upper end similarly anchored to an angle member 134 (FIG. 2) that is secured to and extends transversely across a sub-frame 135. A plurality of spaced slots 136 (only one being shown in FIGS. 2, 3 and 4) are formed in the draper 30 near its upper end.

A plurality of series of independently suspended weights 138 (FIGS. 1, 2 and 3) are supported by arms 139 pivoted on rods 140 (FIG. 2) that are secured to brackets 142 that extend transversely of the elevator and are secured to adjacent frame members 143. It will be noted that the weights 138 bear against the draper 30 and are pivotally supported at their forward ends. The point of contact of each weight against the draper not only provide sufficient force to cause the fruit to roll, but also serves as a one-way gate which allows the fruit to move upwardly therepast but prevents the fruit from moving down past the independently suspended weights 138.

After being rolled up the elevator 22 the partially cleaned fruit F moves into the trash separator 14 (FIGS. 2, 3 and 4) for further cleaning. The trash separator includes the previously mentioned clamping roller 32 which has a peripheral surface and is supported by a shaft 45. The shaft 45 is journaled on the free end of a pair of arms 146 that have their opposite ends pivoted at 147 by bolts to the side wall 148 of the sub-frame 135 in axial alignment with a jack shaft 150. The side walls 148 are apertured at 151 (FIG. 3) to permit the ends of the shaft 145 to extend outwardly of the side walls 148. Springs 152 are connected between the free ends of the arms 146 and a portion of the sub-frame 135 to urge the clamping roller 32 against the elevator as it moves around the upper elevator pulley 154 secured to a shaft 155. In order to guide debris such as twigs and grass between the clamping roller 32 and the elevator, a plurality of curved hold-down fingers 156 (FIGS. 3 and 4) are independently suspended for pivotal movement on a rod 158 extending transversely of and secured to the sub-frame 135. The fingers 156 extend through the slots 136 in the draper 30 and have free ends which curve around the upper portion of the elevator pulley 114 to hold the debris against the elevator. As best shown in FIG. 4, the hold-down fingers 156 are spaced apart a distance greater than the diameter of the fruit F thereby permitting the fruit along with other debris to gravitate over the upper end of the elevator 22 onto the cleaning belt conveyor 36, while the twigs, grass, and the like are gripped by the clamping roller 32 and is discharged directly upon the ground.

The cleaning belt conveyor 36 (FIGS. 2 and 3) includes a pivotal sub-frame 159 and is trained around an upper roller 160 keyed to a shaft 162, and a lower roller 164 keyed to a shaft 166. The upper shaft 162 is journaled on the sub-frame 135 and has the upper end of the conveyor sub-frame 159 journaled thereon. The lower shaft 166 is journaled only on the conveyor sub-frame 159 thus allowing the conveyor 36 to be pivoted about the shaft 162 by a hydraulic cylinder 167 connected between the sub-frame 135 and the conveyor sub-frame 159. The upper run 38 of the conveyor 36 is driven upwardly, and is upwardly and forwardly inclined. The inclination of the conveyor 36 may be varied by actuation of the hydraulic cylinder 167 to pivot the conveyor to any inclination within the range of about 10° to 30°. The dirt, debris, and defective fruit such as damaged or partially rotted fruit which resists rolling, is advanced up the conveyor 36 and is discharged off the upper end thereof onto the ground. The rollable fruit F rolls off the lower end of the cleaning belt onto the cross-bar or drag bar elevator 40. When the conveyor 36 is moved to its low inclination position a section of belting 170 carried by the frame 159 aids in guiding the fruit into the elevator 40.

The drag bar elevator 40 (FIG. 1) includes cross-bars 176 which advance the fruit F, along with any remaining debris, upwardly over the screen 46 causing the small debris to sift through the screen. The cleaned fruit then gravitates over the upper end of the drag bar elevator 40 onto the loading conveyor 47 for conveyance to the chute 48 and discharge into the bulk bin of the truck (not shown).

A drive mechanism 220 (FIG. 5) is provided for driving the several components of the pickup machine 20 from the power take-off 54 of a tractor 53 that is coupled to and pulls the pickup machine along the windrow of fruit to be picked up.

The drive mechanism 220 comprises a telescoping drive shaft 224 coupled to the power take-off 54 and an input shaft 226 by universal joints 228. A chain drive 230 connects the input shaft 226 to an elongated drive shaft 232 that is connected to the input of a gear box 234 by universal joints 236 and an intermediate shaft 238. The output shaft 240 of the gearbox 234 is connected by a chain drive 242 to the jackshaft 150. The jackshaft 150 is connected to and drives the elevator or head shaft 155 by a pair of chain drives 152 located at opposite ends of the shafts 150 and 155. Thus, the upper run of the elevator 22 is driven upwardly, or clockwise, as indicated by the arrows in FIG. 5.

In order to drive the clamping or devining roller 32 and the cleaning conveyor 36 in the opposite or clockwise direction, a multiple sprocket unit 244 is journaled on the jackshaft 150. The sprocket unit 244 is driven by an endless chain 246 that is driven by a sprocket 248 keyed to the shaft 155. The chain 246 also drives a sprocket 250 of the multiple sprocket unit 244, an idler sprocket 252, and a sprocket 254 keyed to the drive shaft 162 of the cleaning conveyor. Thus, the devining roller 32 and the cleaning conveyor 36 are driven in the directions indicated by the arrows in FIG. 5.

The cross-bar elevator 40 is driven from the shaft 155 by a double belt drive 256 which includes a pulley 258 keyed to the shaft 155, a pulley 260 keyed to an intermediate shaft 262 and a pair of endless belts 264 (FIG. 10) trained around the pulleys 258 and 260. A chain drive 266 is connected between the shaft 262 and the elevator driveshaft thus driving the upper run of the elevator 40 upwardly as indicated in FIG. 5.

In operation, the article pick-up machine 20 of the present invention, when used in a citrus harvesting operation, is first coupled to the drawbar of a tractor 53 for towing, is coupled to the power take-off shaft 54 for providing rotary power to drive the mechanical parts of the machine 20, and is coupled to the hydraulic system of the tractor for providing hydraulic fluid under pressure to the several hydraulic components of the machine. The operator then drives the machine into a citrus grove which has previously had the fruit F shaken from the trees and rakes into windrows. While driving to the grove, the machine has the cross-bar elevator 40, the loading conveyor 47 and the chute 48 held in their substantially vertical transport positions. Steering at this time and during pickup operation may be aided by selectively controlling hydraulic cylinder 58 (FIG. 1A). Also, during this time the pickup elevator 22 is raised off the ground by hydraulic cylinder 68 (FIG. 2).

When in position to commence the pickup operation, the several components are hydraulically moved to their full line pickup positions illustrated in FIG. 2. Also, the chute 48 is placed in its operative position and a truck (not shown) is driven behind the vehicle for collecting the fruit. The hydraulic cylinder 68 of the pickup elevator 22 are then placed in neutral, the power take-off is engaged, and the machine is driven along the windrow. The fruit is moved upwardly between the elevator 22 and the draper 30 at which time the resistance imparted to the fruit by the draper causes the fruit to rotate to dislodge debris therefrom. Also, the weights 138 bear against the draper 30 to permit upward movement of the fruit but preclude downward movement thereof. Some debris carried up the elevator falls through the elevator bars 110. Long or stringy debris is clamped between the devining roller 32 and the elevator 22 and, accordingly, is removed from the system by being discharged upon the ground. Still other debris, including defective fruit which resists rolling, falls onto the inclined cleaning conveyor 36 and is conveyed off the upper end thereof. The remaining marketable fruit gravitates off the lower end of the cleaning conveyor 36 and falls into the cross-bar elevator 40. The elevator 40, loading conveyor 47 and chute 48 then discharge and spread the clean fruit into the bulk body of the truck.

From the foregoing description it is apparent that the trash separator of the present invention includes means for controlling the movement of the articles up a steeply inclined elevator, while partially cleaning the same, and includes additional cleaning means which not only removes dirt and debris from the system but also removes defective articles that resist rolling.

Although the best mode contemplated for carrying out the present invention has been herein shown and described, it will be apparent that modification and variation may be made without departing from what is regarded to be the subject matter of the invention.

What I claim is:

1. A trash separator for rollable articles, comprising an upwardly driven, upwardly inclined bar conveyor having spaced rods thereon for supporting rollable articles, debris and defective articles which resist rolling;

a stationary, flexible draper lying above, parallel to and adjacent to the upper run of said first conveyor in position to engage the upper surfaces of the articles to cause the articles to roll up said first conveyor and dislodge the fine debris clinging to the articles, with the fine debris being allowed to fall between the bars of said first conveyor to the ground below;

means for anchoring one end of the draper to said first conveyor;

force applying means bearing against said draper from above and being movable to allow the articles to roll upwardly therepast, while precluding movement of the articles in a generally downward direction;

a second conveyor comprising an upwardly driven, upwardly inclined imperforate roughened belt conveyor having its upper run moving upwardly in a direction opposite to that of the direction of movement of said first conveyor with respect to the horizontal, and having the upper end of its upper run disposed in position immediately below the upper end of said first conveyor so as to receive the articles and remaining debris discharged from the upper end of said first conveyor, wherein the upper run of said second inclined conveyor carries the fine debris and defective, non-rollable articles over the upper end of said second conveyor for discharge therefrom, the inclination of said second inclined conveyor being sufficient to allow the rollable articles to roll down and off the lower end of said inclined conveyor, whereby said second inclined conveyor is so arranged that the debris and defective articles discharged from said second inclined conveyor fall under said first conveyor in the same general area where falls the fine debris dislodged by and through said first conveyor;

a third conveyor comprising an upwardly driven, upwardly inclined conveyor having the lower end of its upper run disposed in position immediately below the lower end of said second inclined conveyor so as to receive the rollable articles discharged from said second inclined conveyor and having its upper run moving in the same direction as that of the upper run of said first conveyor with respect to the horizontal, wherein said third inclined conveyor carries the rollable articles to a collection point.

2. A trash separator as described in claim 1, including a clamping roller located at the upper end of said first inclined conveyor and movable support means urging said clamping roller against a portion of said first inclined conveyor for gripping stringy or long debris therebetween and removing such debris from the path of movement of the rollable or defective articles.

* * * * *

UNITED STATES PATENT OFFICE
CERTIFICATE OF CORRECTION

PATENT NO. : 3,886,951
DATED : June 3, 1975
INVENTOR(S) : LEON R. MC ROBERT

It is certified that error appears in the above-identified patent and that said Letters Patent are hereby corrected as shown below:

ON FIRST PAGE OF THE LETTERS PATENT THE ASSIGNEE WAS LEFT OUT. SHOULD BE: --Assignee FMC Corporation, San Jose, Calif.--.

Column 1, line 35, delete "SUMMARY OF THE IN-"

Column 1, line 36, delete "VENTION"

Column 1, line 36, insert and center --SUMMARY OF THE INVENTION--.

Signed and Sealed this second Day of March 1976

[SEAL]

Attest:

RUTH C. MASON
Attesting Officer

C. MARSHALL DANN
Commissioner of Patents and Trademarks